US011392321B2

(12) United States Patent
Jeon et al.

(10) Patent No.: US 11,392,321 B2
(45) Date of Patent: Jul. 19, 2022

(54) MEMORY SYSTEM RESTORING DATA BASED ON PARITY DATA AND OPERATING METHOD THEREOF

(71) Applicant: SK hynix Inc., Icheon (KR)

(72) Inventors: Duk Joon Jeon, Icheon (KR); Jong Ryool Kim, Icheon (KR)

(73) Assignee: SK hynix Inc., Icheon (KR)

( * ) Notice: Subject to any disclaimer, the term of this patent is extended or adjusted under 35 U.S.C. 154(b) by 67 days.

(21) Appl. No.: 16/933,591

(22) Filed: Jul. 20, 2020

(65) Prior Publication Data

US 2021/0263681 A1 Aug. 26, 2021

(30) Foreign Application Priority Data

Feb. 25, 2020 (KR) .................. 10-2020-0022965

(51) Int. Cl.
*G06F 12/00* (2006.01)
*G06F 3/06* (2006.01)
*G06F 11/10* (2006.01)
(52) U.S. Cl.
CPC .......... *G06F 3/0659* (2013.01); *G06F 3/0619* (2013.01); *G06F 3/0679* (2013.01); *G06F 11/1004* (2013.01)

(58) Field of Classification Search
CPC .... G06F 3/0659; G06F 3/0619; G06F 3/0679; G06F 11/1004; G06F 11/1048; G06F 3/0611; G06F 3/0655; G06F 11/1008
USPC ........................................................ 711/103
See application file for complete search history.

(56) References Cited

U.S. PATENT DOCUMENTS 5,596,708 A * 1/1997 Weber ................. G06F 11/1076
714/6.12
2019/0179746 A1* 6/2019 Ohno ..................... G06F 3/0619

FOREIGN PATENT DOCUMENTS

KR 20140007333 A 1/2014
KR 20190069806 A 6/2019

* cited by examiner

*Primary Examiner* — Mardochee Chery

(57) ABSTRACT

A memory system may include a plurality of nonvolatile memory devices, a first operation unit configured to perform a first operation on target data stored in target nonvolatile memory devices, and one or more second operation units configured to perform second operations. The first operation unit performs the first operation by reading target data and parity data from nonvolatile memory devices not associated with second operations concurrently performed by the second operation units.

14 Claims, 8 Drawing Sheets

MEMORY SYSTEM RESTORING DATA BASED ON PARITY DATA AND OPERATING METHOD THEREOF

CROSS-REFERENCES TO RELATED APPLICATION

The present application claims priority under 35 U.S.C. § 119(a) to Korean application number 10-2020-0022965, filed on Feb. 25, 2020, in the Korean Intellectual Property Office, which is incorporated herein by reference in its entirety.

BACKGROUND

1. Technical Field

Various embodiments generally relate to a memory system, and more particularly, to a memory system including a nonvolatile memory device.

2. Related Art

A memory system may be configured to store data provided by a host device in response to a write request received from the host device. Furthermore, the memory system may be configured to provide the host device with stored data in response to a read request received from the host device. The host device is an electronic device capable of processing data, and may include a computer, a digital camera and/or a mobile phone or other mobile device. The memory system may be embedded in the host device or may be fabricated as a separate device that is coupled to the host device.

SUMMARY

Embodiments of the disclosed technology provide a memory system and associated method that provides deterministic latency for a host device.

In an embodiment, a memory system may include a plurality of nonvolatile memory devices; a first operation unit configured to perform a first operation on target data stored in target nonvolatile memory devices of the plurality of nonvolatile memory devices; and one or more second operation units configured to perform second operations on one or more target nonvolatile memory devices, wherein, when the one or more second operation units are performing the second operations on the one or more target nonvolatile memory devices, the first operation unit performs the first operation by reading target data and parity data from nonvolatile memory devices not associated with the one or more target nonvolatile memory devices associated with the second operations.

In an embodiment, an operating method of a memory system may include determining whether a second operation is performed on a first portion of target nonvolatile memory devices of the memory system before performing a first operation; reading target data and parity data from a second portion of the target nonvolatile memory devices of the memory system when it is determined that the second operation is being performed, the second portion being different than the first portion; restoring unread target data from the first portion of the target nonvolatile memory devices based on the read target data and parity data from the second portion of the target nonvolatile memory devices; and performing the first operation on the read target data and the restored target data.

In an embodiment, a memory system may include a storage medium including a plurality of nonvolatile memory devices for storing target data and parity data associated with the target data; a first operation unit configured to perform a first operation on the target data; and at least one second operation unit configured to perform a second operation on the target data, wherein the first operation unit performs the first operation by reading the parity data from the storage medium for target data stored in a nonvolatile memory device accessed by the second operation unit when performing the second operation.

DETAILED DESCRIPTION

Figure 1:
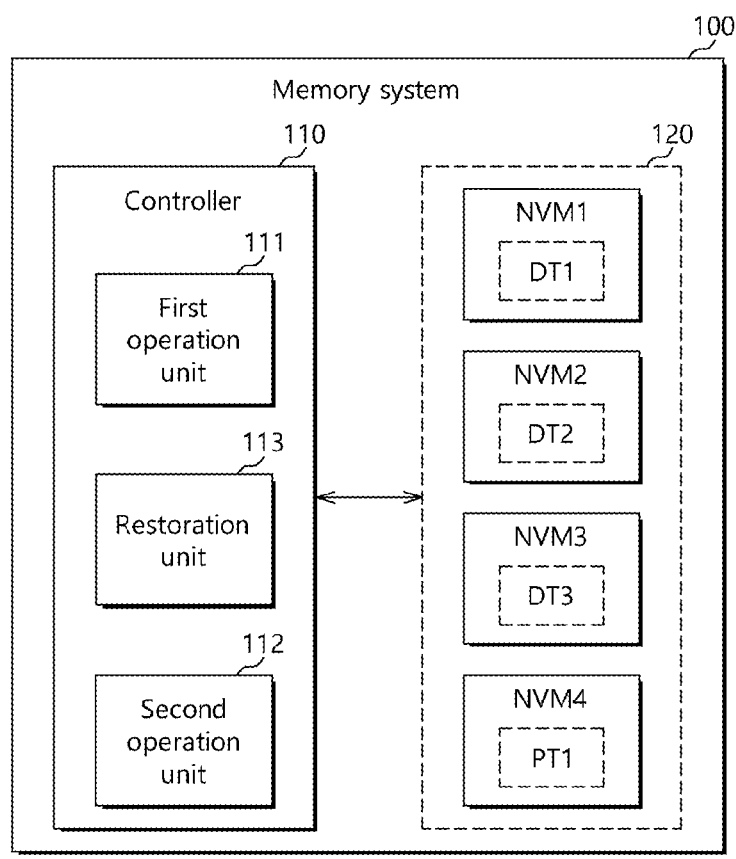
FIG. 1 illustrates a memory system according to an embodiment.

Advantages and characteristics of this disclosure, and methods of achieving them, are described through the various described embodiments described in detail along with the accompanying drawings. However, this disclosure is not limited to the embodiments described herein, and may be materialized in other forms. The present embodiments are provided to describe the disclosure in detail to the extent that a person having ordinary skill in the art may readily carry out the technical spirit of the disclosure.

In the drawings, embodiments of the present disclosure are not limited to specific forms illustrated in the drawings and have been exaggerated for clarity. Specific terms have been used in the specification, but the terms are used to only describe the present disclosure, not to limit the meaning of the terms or the scope of right of the present disclosure written in the claims.

In the specification, an expression "and/or" is used as a meaning including at least one of elements listed front and back. Furthermore, an expression "connected/coupled" is used as a meaning including that one element is directly connected to another element and that the two elements are indirectly connected through a still another element. In the specification, the singular form includes the plural form unless specially described otherwise. Furthermore, terms, such as "includes or comprises" and/or "including or comprising" used in the specification, mean the existence or addition of one or more other elements, steps, operations and/or devices, in addition to the described elements, steps, operations and/or devices.

Hereinafter, embodiments are described in detail with reference to the accompanying drawings.

FIG. 1 illustrates a memory system 100 according to an embodiment.

The memory system 100 may be configured to store data provided by an external host device in response to a write request received from the host device. Furthermore, the memory system 100 may be configured to provide stored data to the host device in response to a read request received from the host device.

The memory system 100 may be configured as a Personal Computer Memory Card International Association (PCM-CIA) card, a Compact Flash (CF) card, a smart media card, a memory stick, various multimedia cards (MMC (Multi-MediaCard), eMMC (embedded MMC), RS-MMC (Reduced-Size MMC), and MMC-Micro), various secure digital (SD) cards (SD, Mini-SD, and Micro-SD), a Universal Flash Storage (UFS), and/or a Solid State Drive (SSD).

The memory system 100 may include a controller 110 and a storage medium 120. In an embodiment, the controller 110 is a digital circuit that manages the flow of data going to and from the storage medium 120. The controller may be formed on a chip independently or integrated with one or more other circuits.

The controller 110 may control an overall operation of the memory system 100. The controller 110 may control the storage medium 120 in order to perform a foreground operation in response to an instruction received from the host device. The foreground operation may include an operation of writing data to the storage medium 120 or reading data from the storage medium 120 in response to an instruction from the host device. For example, the instruction received from the host device may be a write request or a read request.

Furthermore, the controller 110 may control the storage medium 120 in order to perform a background operation that is internal to the storage medium 120 and/or independent of any instructions received from the host device. The background operation may include at least one of: a wear-leveling operation, a garbage collection operation, an erase operation, a read reclaim operation, and a refresh operation, for the storage medium 120. Like the foreground operation, the background operation may include an operation of writing data to the storage medium 120 or reading data from the storage medium 120.

The controller 110 may store data in the storage medium 120 using a Redundant Array of Inexpensive Disks (RAID) method. For example, the controller 110 may distribute and store data DT1 to DT3 in nonvolatile memory devices NVM1 to NVM3, and may store parity data PT1 for the data DT1 to DT3 in the nonvolatile memory device NVM4. The number of nonvolatile memory devices for storing parity data is not limited to one and may vary depending on the RAID structure or configuration.

The controller 110 may include a first operation unit 111, a second operation unit 112, and a restoration unit 113. In some embodiments, the first operation unit 111, the second operation unit 112, and/or the restoration unit 113 are digital controllers or operations circuits that perform some or all of the operations described herein.

The first operation unit 111 may perform a first operation by accessing the storage medium 120. Examples of the first operation include a write operation, a read operation, a wear-leveling operation, a garbage collection operation, an erase operation, a read reclaim operation, and a refresh operation.

The second operation unit 112 may perform a second operation by accessing the storage medium 120. Examples of the second operation include a write operation, a read operation, a wear-leveling operation, a garbage collection operation, an erase operation, a read reclaim operation, and a refresh operation.

In some embodiments, the first operation of the first operation unit 111 and/or the second operation of the second operation unit 112 may be dynamically assigned a priority of operation based on various factors associated with the host device and/or the memory system 100. For example, the performance of operations to be prioritized may include operations associated with the first operation performed by the first operation unit 111 and/or operations associated with the second operation performed by the second operation unit 112.

As another example, an operation that accesses more nonvolatile memory devices within the storage medium 120, with respect to other operations, may be prioritized with respect to the other operations.

Also, any operation identified by the host device and associated with the first operation performed by the first operation unit 111 and/or associated with the second operation performed by the second operation unit 112 may have priority. For example, an operation associated with the first operation performed by the first operation unit 111 and/or associated with the second operation performed by the second operation unit 112 and that is performed by reading and accessing the storage medium 120 may have priority.

Thus, in an embodiment, the first operation may be an operation that is requested by the host device and that is performed by reading and accessing the storage medium 120. Following the embodiment, the first operation of the first operation unit 111 takes priority over the second operation of the second operation unit 112. However, in other embodiments, the operating method may be applied in a reverse order, where performance of the second operation is prioritized over performance of the first operation embodiment.

The first operation unit 111 and the second operation unit 112 may operate as follows in parallel at the same time.

First, the second operation unit 112, having a low priority of operation, may operate in a round-robin manner. For example, when the second operation unit 112 is requested or ready to perform the second operation on the nonvolatile memory devices NVM1 and NVM2, the second operation unit 112 may perform the second operation on the nonvolatile memory device NVM2 after completing the second operation on the nonvolatile memory device NVM1. Thus, the second operation unit 112 may perform the second operation on only one nonvolatile memory device within the storage medium 120 at a time.

The first operation unit 111 may perform the first operation on target data associated with parity data. A target nonvolatile memory device may be a nonvolatile memory device that stores target data for which the first operation of the first operation unit 111 is performed.

For example, the first operation unit 111 may perform the first operation on the target data DT1 to DT3, where target data DT1, target data DT2, and target data DT3 are each associated with the parity data PT1. In this example, the first operation unit 111 may determine whether the second operation performed by the second operation unit 112 is being performed on any one of the target nonvolatile memory devices NVM1 to NMV3 in which the target data DT1 to DT3 has been stored, respectively. When the second operation unit 112 is performing the second operation on the nonvolatile memory device NVM1, for example, the first operation unit 111 may perform the first operation based on the target data DT2 and DT3 and parity data PT1 read from the other nonvolatile memory devices NVM2 to NMV4 (and not read from the nonvolatile memory device NVM1).

Specifically, the first operation unit 111 may control the restoration unit 113 to restore the target data DT1, stored in the nonvolatile memory device NVM1, based on the target data DT2 and DT3 and parity data PT1 read from the nonvolatile memory devices NVM2 to NMV4. Accordingly, although the first operation unit 111 does not read the target data DT1 from the nonvolatile memory device NVM1, the first operation unit 111 may obtain the target data DT1 based on the target data DT2 and DT3 and the parity data PT1.

When obtaining the target data DT1 restored by the restoration unit 113, the first operation unit 111 may perform the first operation on all the target data DT1 to DT3.

When the second operation unit 112 is not performing the second operation on any one of the target nonvolatile memory devices NVM1 to NMV3, the first operation unit 111 may perform the first operation by directly reading all the target data DT1 to DT3 from the target nonvolatile memory devices NVM1 to NMV3.

In some embodiments, when the first operation unit 111 is not performing the first operation, the second operation unit 112 may perform the second operation by freely accessing the nonvolatile memory devices NVM1 to NMV4 without following a round-robin manner. In some embodiments, when the first operation unit 111 attempts to start the first operation while the second operation unit 112 is performing the second operation, the second operation unit 112 may change its method of accessing the nonvolatile memory devices NVM1 to NMV4 to the round-robin method described herein and perform the second operation accordingly.

Also, the restoration unit 113 may correct errors within or having occurred in the data DT1 to DT3 based on the data DT1 to DT3 and parity data PT1 read from the storage medium 120.

Furthermore, the restoration unit 113 may perform a restoration operation under the control of the first operation unit 111, with the restoration operation having a high priority. A method for the restoration unit 113 to correct an error and a method for the restoration unit 113 to restore data may be performed according to the same principle. Specifically, although only some (e.g., a portion) of the data DT1 to DT3 and the parity data PT1 is read from the storage medium 120, the restoration unit 113 may restore data that has not been read based on the portion of the data and the parity data PT1 that has been read.

In FIG. 1, the restoration unit 113 has been illustrated as being a separate element. In some embodiments, however, the restoration unit 113 may be included in or part of the first operation unit 111 and/or the second operation unit 112.

In other words, the first operation unit 111 may obtain, using the RAID structure, data stored in a target nonvolatile memory device being accessed by the second operation unit 112, although the first operation unit 111 does not access the target nonvolatile memory device. Accordingly, the first operation unit 111 and the second operation unit 112 can operate at the same time in parallel, and thus performance of the memory system 100 can be improved or enhanced. Thus, by performing operations as described herein, the first operation unit 111 can provide or instill deterministic latency with respect to a host device.

The storage medium 120 may store data transmitted by the controller 110 under the control of the controller 110, may read stored data, and may transmit the read data to the controller 110. The storage medium 120 may include the nonvolatile memory devices NVM1 to NVM4.

The nonvolatile memory device may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and/or other flash memory devices.

The nonvolatile memory device may include one or more planes, one or more memory chips, one or more memory dies, and/or one or more memory packages.

FIG. 1 illustrates the storage medium 120 having four nonvolatile memory devices NVM1 to NVM4, but the number of nonvolatile memory devices is not limited to four devices, and the storage medium 120 may have fewer or more nonvolatile memory devices.

Figure 2A:
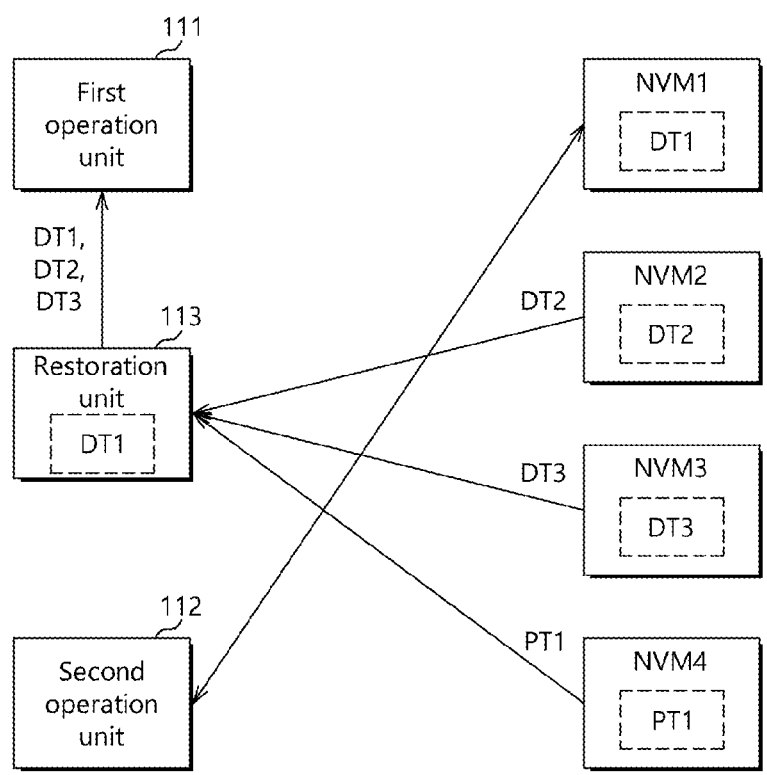
FIGS. 2A and 2B illustrate a method for a first operation unit and second operation unit to operate in parallel at the same time according to an embodiment.
Figure 2B:
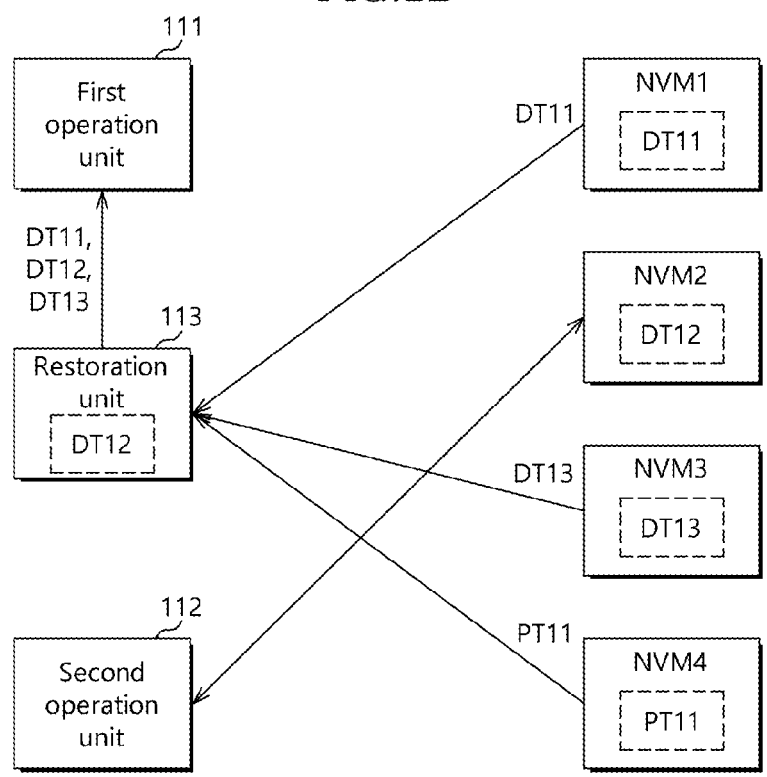

FIGS. 2A and 2B illustrate a method for the first operation unit 111 and the second operation unit 112 to operate in parallel at the same time according to an embodiment.

Referring to FIG. 2A, the second operation unit 112 may be performing the second operation on the nonvolatile memory device NVM1 in a round-robin manner or method.

Prior to performing the first operation for the target data DT1 to DT3, the first operation unit 111 may determine whether the second operation unit 112 is performing the second operation on any one of the target nonvolatile memory devices NVM1 to NVM3. Since the second operation unit 112 is performing the second operation on the target nonvolatile memory device NVM1, the first operation unit 111 may read the target data DT2 and DT3 and the parity data PT1 from the remaining nonvolatile memory devices NVM2 to NVM4 (and not from the target nonvolatile memory device NVM1).

The restoration unit 113 may restore the target data DT1 based on the target data DT2 and DT3 and the parity data PT1 under the control of the first operation unit 111, and may transmit the target data DT1 to DT3 to the first operation unit 111. Accordingly, the first operation unit 111 may perform the first operation on the target data DT1 to DT3.

Referring to FIG. 2B, the second operation unit 112 may be subsequently performing the second operation on the nonvolatile memory device NVM2 (following the round-robin method).

When the first operation unit 111 continues to perform the first operation on target data DT11 to DT13 associated with parity data PT11, the first operation unit 111 may perform the first operation by obtaining the data DT12 using the RAID structure, as depicted in FIG. 2A.

Thus, the first operation unit 111 may read the target data DT11 and DT13 and the parity data PT11 from the nonvolatile memory devices NVM1, NVM3 and NVM4.

The restoration unit 113 may restore the target data DT12 based on the target data DT11 and DT13 and the parity data PT11 under the control of the first operation unit 111, and may transmit the target data DT11 to DT13 to the first operation unit 111. Accordingly, the first operation unit 111 may perform the first operation on the target data DT11 to DT13.

Figure 3:
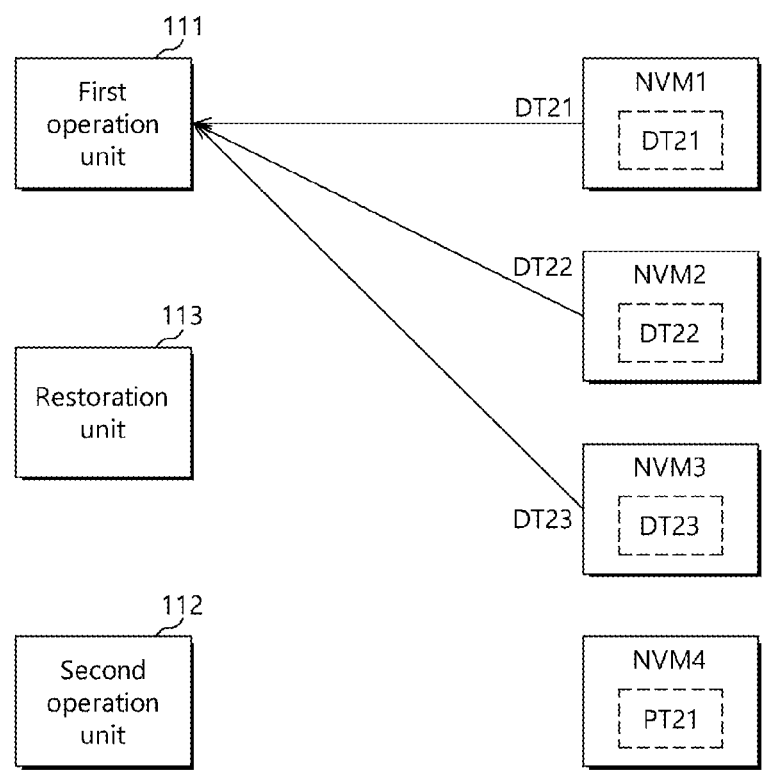
FIG. 3 illustrates an operating method of the first operation unit according to an embodiment.

FIG. 3 illustrates an operating method of the first operation unit 111 according to an embodiment.

Referring to FIG. 3, the first operation unit 111 is to perform the first operation on target data DT21 to DT23 stored in the target nonvolatile memory devices NVM1 to NVM3. At this time, the second operation unit 112 may not be performing the second operation on any one of the target nonvolatile memory devices NVM1 to NVM3.

Accordingly, as described herein, the first operation unit 111 may directly read all the target data DT21 to DT23 from the target nonvolatile memory devices NVM1 to NVM3 without a restoration operation. The first operation unit 111 may perform the first operation on the target data DT21 to DT23.

Figure 4:
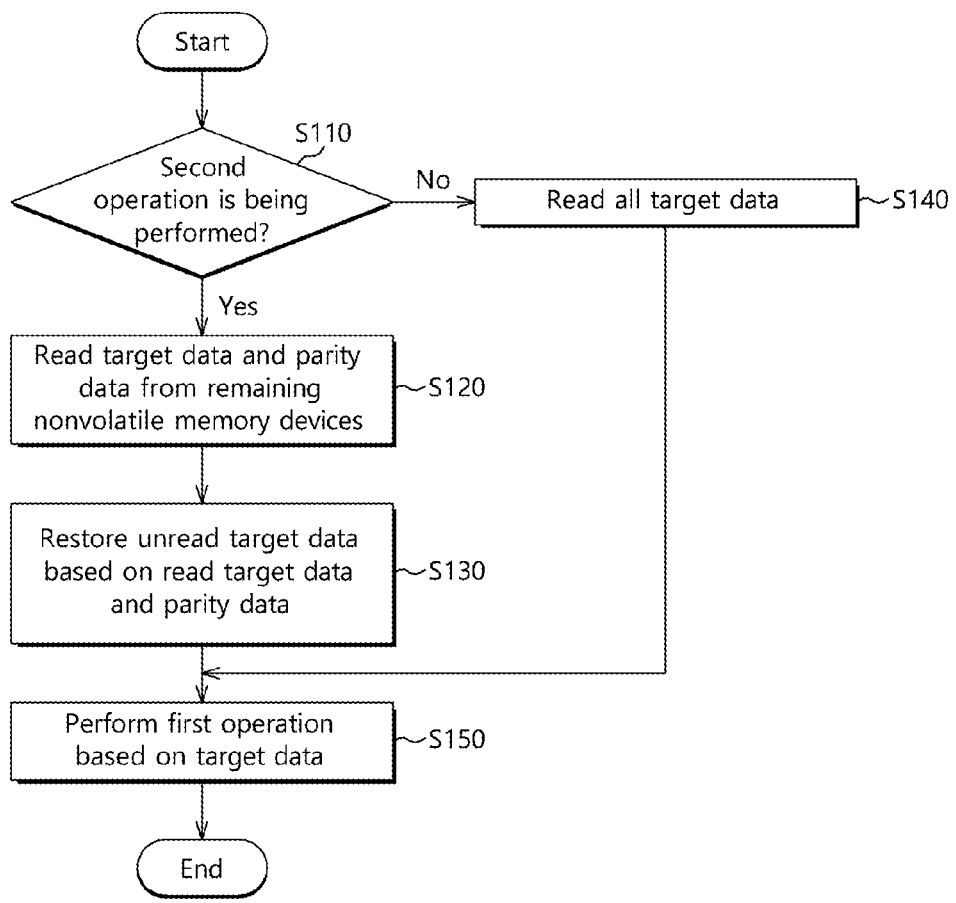
FIG. 4 illustrates an operating method of the first operation unit according to an embodiment.

FIG. 4 illustrates an operating method of the first operation unit 111 according to an embodiment.

Referring to FIG. 4, at step S110, the first operation unit 111 may determine whether the second operation unit 112 is performing the second operation on any one of one or more target nonvolatile memory devices. When the second operation is being performed on any one of the target nonvolatile memory devices, the method may proceed to step S120. When the second operation is not being performed on any one of the target nonvolatile memory devices, the method may proceed to step S140.

At step S120, the first operation unit 111 may read target data and parity data from the remaining nonvolatile memory devices, but not from a target nonvolatile memory device on which the second operation is being performed.

At step S130, the first operation unit 111 may control the restoration unit 113 to restore unread target data based on the read target data and parity data. For example, the restoration unit 113, under control of the first operation unit 111, restores target data from the target nonvolatile memory device on which the second operation is being performed using the read target data and parity data. Once the unread target data is restored, the method proceeds from step S130 to step S150.

At step S140, the first operation unit 111 may read all target data from the target nonvolatile memory devices.

At step S150, the first operation unit 111 may perform the first operation based on the target data (in either step S130 or step S140). Thus, the first operation unit 111 may perform the first operation on all the target data when or while the second operation unit 112 is performing the second operation on a target nonvolatile memory device.

Figure 5:
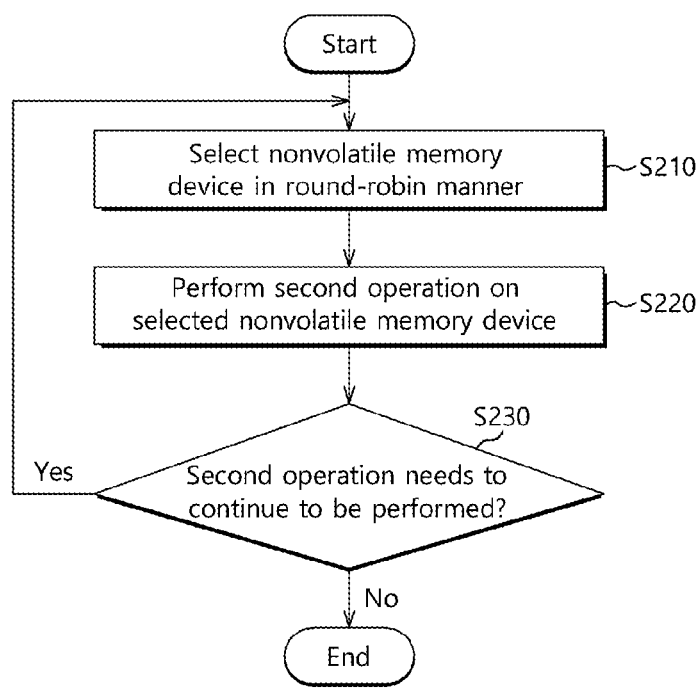
FIG. 5 illustrates an operating method of the second operation unit according to an embodiment.

FIG. 5 illustrates an operating method of the second operation unit 112 according to an embodiment. In some embodiments, the method illustrated in FIG. 5 may be performed in parallel to the procedure illustrated in FIG. 4.

Referring to FIG. 5, at step S210, the second operation unit 112 may select a nonvolatile memory device on which the second operation will be performed in a round-robin manner or method, as described herein.

At step S220, the second operation unit 112 may perform the second operation on the selected nonvolatile memory device.

At step S230, the second operation unit 112 may determine whether to continue to perform the second operation on other nonvolatile memory devices. When the second operation unit 112 determines to continue to perform the second operation on the other nonvolatile memory devices, the method may proceed to step S210. When the second operation unit 112 determines to stop performing the second operation, the method ends.

Figure 6:
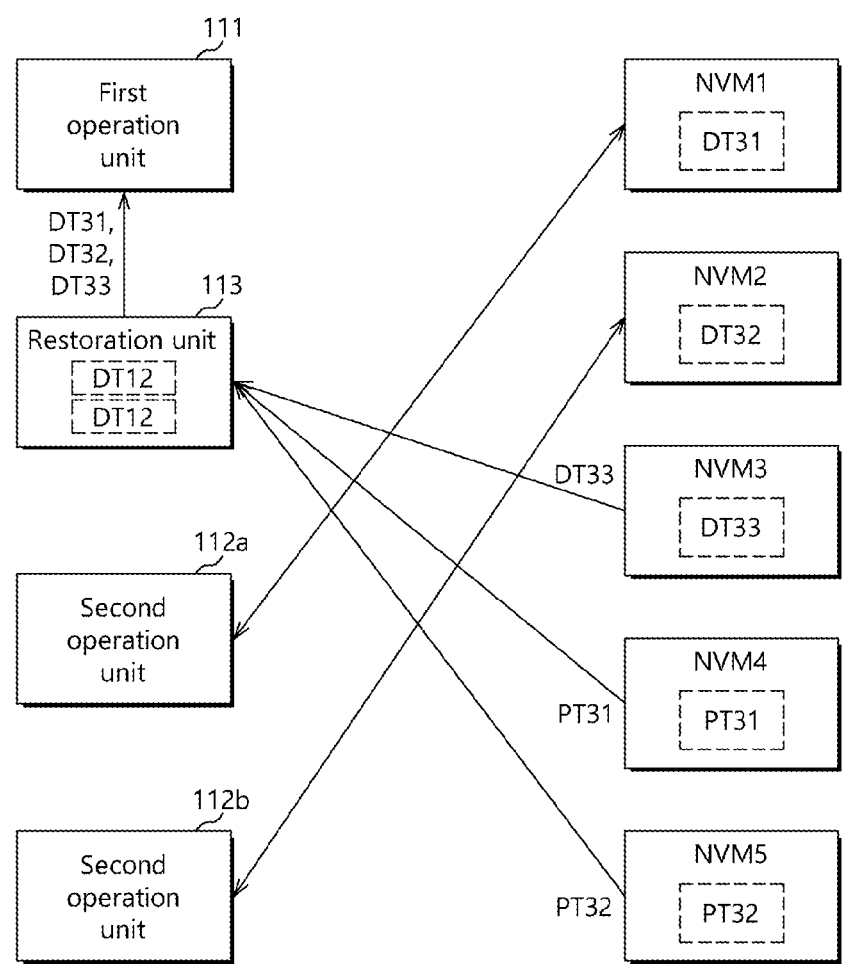
FIG. 6 illustrates a method for the first operation unit and the second operation unit to operate in parallel at the same time according to an embodiment.

FIG. 6 illustrates a method for the first operation unit 111 and second operation units 112a and 112b to operate in parallel at the same time according to an embodiment.

Referring to FIG. 6, in some embodiments, the controller 110 may include the second operation units 112a and 112b. Furthermore, the storage medium 120 may further include a nonvolatile memory device NVM5 in which parity data PT32 is stored. Target data DT31 to DT33 may be associated with both sets of parity data PT31 and PT32.

The second operation units 112a and 112b may be performing the second operations on the nonvolatile memory devices NVM1 and NVM2, respectively, in a round-robin manner.

Prior to performing the first operation for the target data DT31 to DT33, the first operation unit 111 may determine whether the second operation units 112a and 112b are performing the second operations on some of the target nonvolatile memory devices NVM1 to NVM3, respectively. Because the second operation units 112a and 112b are performing the second operations on the target nonvolatile memory devices NVM1 and NVM2, respectively, the first operation unit 111 may read the target data DT33 and the parity data PT31 and PT32 from the remaining nonvolatile memory devices NVM3 to NVM5 (and not from the target nonvolatile memory devices NVM1 and NVM2).

The restoration unit 113 may restore the target data DT31 and DT32, based on the target data DT33 and the parity data PT31 and PT32, under the control of the first operation unit 111, and may transmit the target data DT31 to DT33 to the first operation unit 111. Accordingly, the first operation unit 111 may perform the first operation on the target data DT31 to DT33.

In other words, if n sets of parity data are present, up to n sets of target data may be restored. Accordingly, although a maximum of n second operation units are performing second operations on some of target nonvolatile memory devices, respectively, the first operation unit 111 may perform the first operation by reading target data and parity data from the remaining nonvolatile memory devices. Specifically, the first operation unit 111 may restore target data stored in some of the target nonvolatile memory devices based on the read target data and parity data, and may perform the first operation on the read target data and the restored target data.

Figure 7:
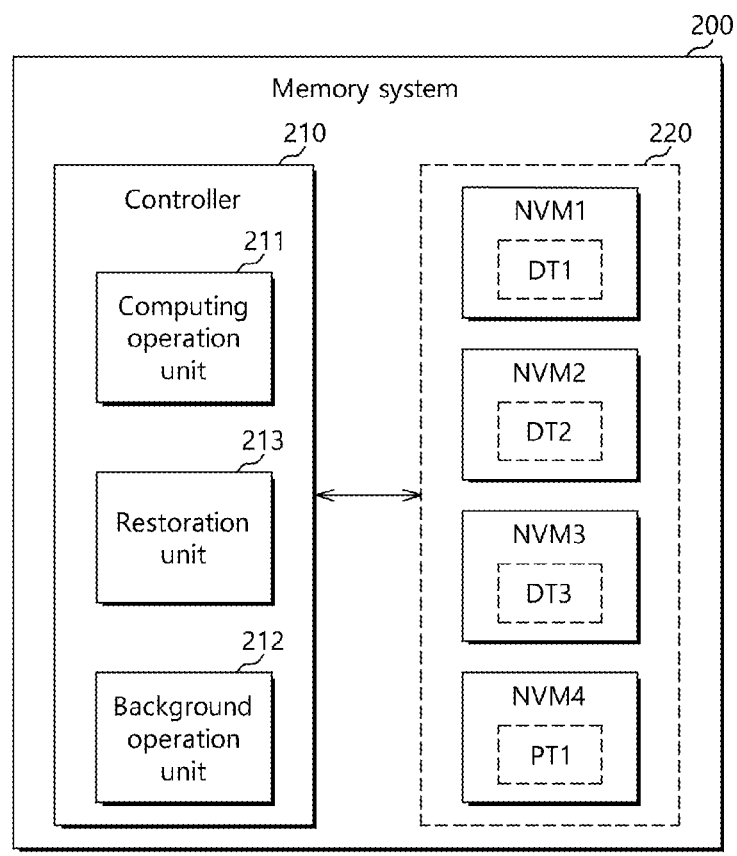
FIG. 7 illustrates a memory system according to an embodiment.

FIG. 7 is a block diagram illustrating a memory system 200 according to an embodiment.

Referring to FIG. 7, the memory system 200 may be a computational SSD. In this case, a controller 210 may include a computing operation unit 211 and a background operation unit 212.

The computing operation unit 211 may perform various computing operations on data, read from the storage medium 220, in response to a request from a host device, and may transmit the results of the operations to the host device. As an example, the computing operation may include an operation of searching for a specific character string.

In other words, the computing operation unit 211 may perform a computing operation to be performed by the host device, instead of the host device. The amount of data transmission to the host device and consumption power of the host device can be reduced by the computing operation of the computing operation unit 211.

The background operation unit 212 may perform a background operation of the memory system 200.

The computing operation unit 211 and the background operation unit 212 may correspond to the first operation unit 111 and the second operation unit 112 in FIG. 1, respectively. The computing operation unit 211, the background operation unit 212, and a restoration unit 213 may operate substantially similarly to the first operation unit 111, the second operation unit 112, and the restoration unit 113 in FIG. 1.

Thus, when the computing operation unit 211 is to perform a computing operation on target data stored in target nonvolatile memory devices of the storage medium 220 and it is determined that the background operation unit 212 is performing a background operation on a first target nonvolatile memory device, the computing operation unit 211 may restore unread target data based on target data and parity data read from the remaining nonvolatile memory devices (and not from the first target nonvolatile memory device), and may perform the computing operation. As described herein, the background operation unit 212 may perform the background operation on one nonvolatile memory device at a time in a round-robin manner.

The memory system and operating method thereof according to embodiments can provide deterministic latency for a host device.

While various embodiments have been described above, it will be understood to those skilled in the art that the embodiments described are examples only. Accordingly, the computation device and the system described herein should not be limited based on the described embodiments.

What is claimed is:

1. A memory system, comprising:
    a plurality of nonvolatile memory devices;
    a first operation unit configured to perform a first operation on target data stored in target nonvolatile memory devices of the plurality of nonvolatile memory devices; and
    one or more second operation units configured to perform second operations on one or more target nonvolatile memory devices,
    wherein, when the one or more second operation units are performing the second operations on the one or more target nonvolatile memory devices, the first operation unit performs the first operation by reading target data and parity data from nonvolatile memory devices not associated with the one or more target nonvolatile memory devices associated with the second operations,
    wherein the first operation unit is configured to perform the first operation by reading all the target data from the target nonvolatile memory devices when the second operation units are not performing the second operations on any target nonvolatile memory devices upon commencement of the first operation.

2. The memory system according to claim 1, wherein the first operation unit is configured to:
    restore target data stored in the one or more target nonvolatile memory devices based on the read target data and parity data; and
    perform the first operation on the read target data and the restored target data.

3. The memory system according to claim 1, wherein the target data on which the first operation is performed is associated with the parity data.

4. The memory system according to claim 1, wherein each of the one or more second operation units is configured to perform a second operation on one of the plurality of nonvolatile memory devices in a round-robin manner.

5. The memory system according to claim 1, wherein the memory system comprises a computational solid state drive.

6. The memory system according to claim 1, wherein:
    the first operation comprises a computing operation based on a request from a host device, and
    the first operation unit executes the computing operation and transmits results of the executed computing operation to the host device.

7. The memory system according to claim 1, wherein the second operation comprises a background operation of the memory system.

8. A method for operating a memory system, the method comprising:
    determining whether a second operation is performed on a first portion of target nonvolatile memory devices of the memory system before performing a first operation;
    reading target data and parity data from a second portion of the target nonvolatile memory devices of the memory system when it is determined that the second operation is being performed, the second portion being different than the first portion;
    restoring unread target data from the first portion of the target nonvolatile memory devices based on the read target data and parity data from the second portion of the target nonvolatile memory devices;
    performing the first operation on the read target data and the restored target data; and
    reading all target data from the target nonvolatile memory devices of the memory system and performing the first operation on all the read target data, when it is determined that the second operation is not being performed.

9. The method according to claim 8, wherein the memory system comprises a computational solid state drive.

10. A memory system comprising:
    a storage medium including a plurality of nonvolatile memory devices for storing target data and parity data associated with the target data;
    a first operation unit configured to perform a first operation on the target data; and
    at least one second operation unit configured to perform a second operation on the target data,
    wherein the first operation unit performs the first operation by reading the parity data from the storage medium for target data stored in a nonvolatile memory device accessed by the second operation unit when performing the second operation, and
    wherein the first operation unit is configured to:
        read, from the storage medium, the parity data and the target data stored in nonvolatile memory devices not accessed by the second operation unit when performing the second operation, and
        obtain all the target data by restoring the target data stored in the nonvolatile memory device accessed by the second operation unit when performing the second operation.

11. The memory system according to claim 10, wherein the second operation unit is configured to access only one of the plurality of nonvolatile memory devices at a time in a round-robin manner.

12. The memory system according to claim 10, wherein the memory system comprises a computational solid state drive.

13. The memory system according to claim 10, wherein:
    the first operation includes a computing operation requested from a host device, and
    the first operation unit executes the computing operation and transmits results of the executed computing operation to the host device.

14. The memory system according to claim 10, wherein the second operation comprises a background operation of the memory system.

* * * * *